United States Patent
Koradi

(10) Patent No.: US 8,799,817 B2
(45) Date of Patent: Aug. 5, 2014

(54) CAROUSEL USER INTERFACE

(75) Inventor: Reto Koradi, San Jose, CA (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 170 days.

(21) Appl. No.: 13/115,325

(22) Filed: May 25, 2011

(65) Prior Publication Data

US 2012/0304123 A1    Nov. 29, 2012

(51) Int. Cl.
*G06F 3/048* (2013.01)
*G06F 3/0485* (2013.01)
*G06F 3/01* (2006.01)

(52) U.S. Cl.
CPC .............. *G06F 3/048* (2013.01); *G06F 3/0485* (2013.01); *G06F 3/017* (2013.01)
USPC ............................. 715/830; 715/825; 715/863

(58) Field of Classification Search
USPC ......... 715/764, 810, 819, 820, 821, 823, 828, 715/830, 833, 834, 841, 863
See application file for complete search history.

(56) References Cited

U.S. PATENT DOCUMENTS

| | | | |
|---|---|---|---|
| 6,473,751 B1 | 10/2002 | Nikolovska et al. | |
| 7,921,379 B1 | 4/2011 | Ko | |
| 2006/0136246 A1 | 6/2006 | Tu | |
| 2006/0200780 A1* | 9/2006 | Iwema et al. | 715/810 |
| 2008/0022228 A1* | 1/2008 | Kwon et al. | 715/838 |
| 2010/0058248 A1* | 3/2010 | Park | 715/851 |
| 2010/0281374 A1* | 11/2010 | Schulz et al. | 715/723 |

FOREIGN PATENT DOCUMENTS

| | | |
|---|---|---|
| KR | 1020010067115 A | 7/2001 |
| KR | 1020070093432 A | 9/2007 |

* cited by examiner

Primary Examiner — Haoshian Shih

(57) ABSTRACT

A method and an apparatus provide a carousel interface for efficiently accessing data in a touchscreen enabled device. At least one previously navigated object is displayed in a reference region of the carousel interface. Objects associated with a last navigated object are displayed in a carousel belt region of the carousel interface such that the carousel belt region wraps around one end of the reference region. A user input for selecting an object in the carousel interface is received. In response to the user input for selecting an object, the carousel interface is navigated to the selected object, and the carousel interface is updated with the selected object as the last navigated object.

23 Claims, 6 Drawing Sheets

CAROUSEL USER INTERFACE

TECHNICAL FIELD OF THE INVENTION

The present application relates generally to a touchscreen-enabled device and, more specifically, to a method and an apparatus for providing a carousel user interface in a touchscreen-enabled device.

BACKGROUND OF THE INVENTION

Touchscreen technology superimposes touch sensors on a display screen to merge display output and user input functions such that a user can directly interact with a displayed interface by touching portions the display screen. Over the years, computer devices that utilize touchscreen technology have become commonplace, from kiosks in public places to personal handheld devices.

A touchscreen displays images, icons, or buttons on a particular screen for user interaction. Oftentimes, a user must navigate through a series of screens in order to accomplish a particular task. Typical user interfaces on mobile devices require the user navigate through several different screens to perform a task.

For example, a person may want to make a phone call to a contact. The user may first have to navigate to a screen from which a phone dialing application may be launched and then click on the icon that corresponds to the phone dialing application. Upon launching the initial screen for the phone dialing application, the user may navigate to another screen to access a contact list. From there, the user may have to scroll through the contacts and select a contact, which may pull up another screen that displays all the contact information. From this screen, the user may see another menu asking what the user wants to do with the contact, or the user may have to scroll down to find the telephone number to call. In all, a user may have had to navigate through four of five separate screens before making a simple phone call.

In addition users may encounter different interfaces and navigation schemes when transitioning between applications. This takes some effort, and users may get confused as to where they are, how they arrived at the current screen, and how to go back to a previous screen. This is particularly common when a user interacts with an unfamiliar user interface.

Therefore, there is a need in the art for an improved touchscreen user interface. In particular, there is a need for a touchscreen that allows efficient navigation without leaving the current context.

SUMMARY OF THE INVENTION

To address the above-discussed deficiencies of the prior art, a primary object is to provide an improved user interface concept that allows efficient navigation for accessing data on a touchscreen-enabled device.

In one aspect of the present disclosure, a method for use in a touchscreen enabled device is provided. The method includes displaying at least one previously navigated object in a reference region of the carousel interface. Objects associated with a last navigated object are displayed in a carousel belt region of the carousel interface such that the carousel belt region wraps around one end of the reference region. A user input for selecting an object in the carousel interface is received. In response to the user input for selecting an object, the carousel interface is navigated to the selected object, and the carousel interface is updated with the selected object as the last navigated object.

In another aspect of the present disclosure, a device includes a touchscreen and a controller. The touchscreen is configured to receive user input and display a carousel interface that includes a reference region comprising at least one previously navigated object and a carousel belt region of the carousel interface that wraps around one end of the reference region. The carousel belt region includes objects associated with the last navigated object. The controller is configured to control the touchscreen. In response to a user input for selecting an object, the controller navigates to the selected object and updates the carousel interface with the selected object as the last navigated object.

In yet another aspect of the present disclosure, a method for use in a touchscreen enabled device is provided. The method includes displaying a carousel interface that includes a reference region indicating a last navigated object and carousel belt region that wraps around one end of the reference region. The carousel belt region includes objects associated with the last navigated object. In response to a user input for selecting an object, the carousel interface is navigated to the selected object, and the carousel interface is updated such that the selected object is displayed in the reference region as the last navigated object and objects associated with the selected object are arranged on the carousel belt region.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged touchscreen-enabled.

The principles of the present disclosure provide a user interface concept that allows a user to efficiently access data on a touchscreen-enabled device ("touchscreen device"). The user interface concept allows efficient navigation through hierarchies of data and invocation of actions on the data without leaving the current context (e.g. the home screen of a mobile device). In some embodiments, a carousel user interface displays user interface elements in an arrangement that resembles an airport baggage claim carousel. The carousel user interface may also display the complete navigation path through the hierarchy, with easy options to move back.

The carousel user interface concept allows unified navigation to all functionality/data on a device. Users may navigate through arbitrary hierarchies of data, where frequently used objects would typically be placed close to the root of the hierarchy, and less frequently used objects at deeper levels of the hierarchy. Objects may include, applications, media files (audio, video, images, and such), messages (e-mail, SMS, MMS, and such), contacts, calendar appointments, browser bookmarks, documents, and such. Aside from data, objects may also represent actions on the data, like placing a phone call to a person, viewing an image, playing audio/video, adding new data, viewing existing data, editing existing data, and such.

Figure 1:
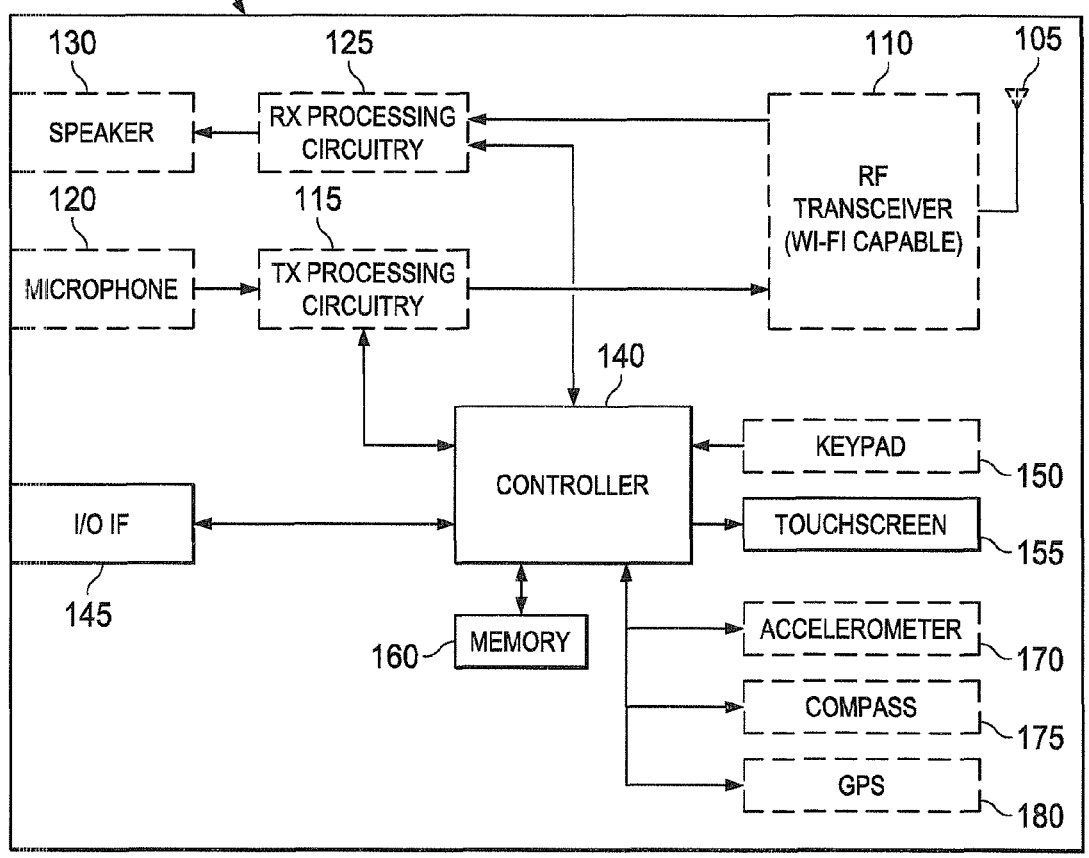
FIG. 1 illustrates a touchscreen-enabled device according to an embodiment of the present disclosure.

FIG. 1 illustrates a touchscreen-enabled device according to an embodiment of the present disclosure. Device 100 includes a controller 140, a memory 160, an input/output (I/O) interface 145, and a touchscreen 155. In addition, device 100 may also include antenna 105, radio frequency (RF) transceiver 110, transmitter (TX) processing circuitry 115, microphone 120, receiver (RX) processor circuitry 125, speaker 130, keypad 150, accelerometer 170, compass 175, and global positioning system (GPS) component 180. The broken lines in FIG. 1 indicate optional components depending on the capabilities of device 100. The present disclosure is not limited to configuration illustration in FIG. 1.

Device 100 may be any touchscreen-enabled device, such as a kiosk, a laptop computer, a personal computer with a touchscreen, a tablet device, an electronic reading device, a touchscreen display, a cell phone, a personal digital assistant (PDA) device equipped with a wireless modem, a personal communication system (PCS) device, or any other type of computer touchscreen device.

Controller 140 may be implemented as a microprocessor or microcontroller. Controller 140 executes basic operating system (OS) program, platform, firmware, and such, which may be stored in memory 160, in order to control the overall operation of device 100. In one embodiment in which the device is a wireless mobile station, controller 140 controls the reception of forward channel signals and the transmission of reverse channel signals by RF transceiver 110, RX processing circuitry 125, and TX processing circuitry 115, in accordance with well known principles. Controller 140 is also capable of controlling and/or interfacing with GPS 180 in order to determine the location of device 100.

Controller 140 is also capable of executing other processes and programs that are resident in memory 160. Controller 140 may move data into or out of memory 160, as required by an executing process. In some embodiments, controller 140 may execute processes related to the user interface. Controller 140 is also coupled to I/O interface 145. I/O interface 145 provides device 100 with the ability to connect to other devices such as laptop computers and handheld computers. I/O interface 145 is the communication path between these accessories and controller 140.

Controller 140 is also coupled to touchscreen 155. In some embodiments, controller 140 may also be coupled to keypad 150. Touchscreen 155 and keypad 150 are used by the end-user of the mobile station to enter data into device 100. Touchscreen 155 is capable of rendering text and/or graphics. Touchscreen 155 may be implemented as a liquid crystal diode (LCD) display, a light emitting diode (LED) display, and such. Alternate embodiments use other types of displays. Touchscreen 155 is the hardware interface that displays the carousel interface with which a user may interact.

Memory 160 is coupled to controller 140. Memory 160 may be comprised of solid-state memory such as random access memory (RAM), various types of read only memory (ROM), or Flash RAM. Memory 160 may also include other types of memory such as micro-hard drives or removable storage media that stores data. Memory 160 stores the core software that provides the basic operational control of device 100. In an embodiment, memory 160 also stores data structures for navigational hierarchies supported by the carousel user interface.

In an embodiment, touchscreen 155 detects a user interaction and sends a raw data representation of the user interaction to controller 140. For devices that support custom gestures, controller 140 may utilize a personalization module (not illustrated in FIG. 1) to determine whether the user interaction is a custom gesture stored in memory 160 and processes the user interaction accordingly. The controller 140 interprets the user interaction, performs a process associated with the user interaction and controls the touchscreen 155 to update the displayed user interface, including navigation steps in the carousel user interface.

In some embodiments, device 100 may support wireless communication. For such embodiments, device 100 may also include antenna 105, RF transceiver 110, TX processing circuitry 115, microphone 120, RX processor circuitry 125, and speaker 130. RF transceiver 110 receives, from antenna 105, an incoming RF signal transmitted through a wireless communication network. RF transceiver 110 down-converts the incoming RF signal to produce an intermediate frequency (IF) or a baseband signal. The IF or baseband signal is sent to RX processing circuitry 125 that produces a processed baseband signal by filtering, decoding, and/or digitizing the baseband or IF signal to produce a processed baseband signal. RX processing circuitry 125 transmits the processed baseband signal to speaker 130 (i.e., voice data) or to controller 140 for further processing (i.e., web browsing).

TX processing circuitry 115 receives analog or digital voice data from microphone 120 or other outgoing baseband data (i.e., web data, e-mail, interactive video game data) from controller 140. TX processing circuitry 115 encodes, multiplexes, and/or digitizes the outgoing baseband data to produce a processed baseband or IF signal.

RF transceiver 110 receives the outgoing processed baseband or IF signal from TX processing circuitry 115. RF transceiver 110 up-converts the baseband or IF signal to an RF signal that is transmitted via antenna 105.

In some embodiments, device 100 may include location and movement detection features such as accelerometer 170, compass 175, and GPS component 180.

Figure 2:
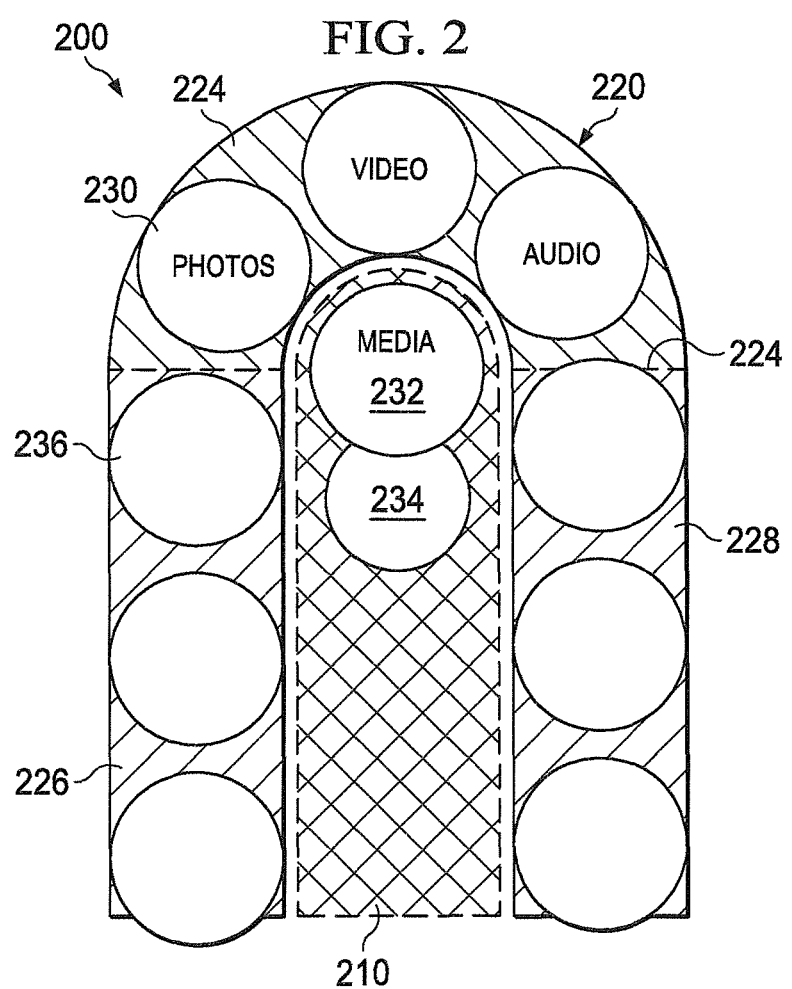
FIG. 2 illustrates a carousel user interface according to an embodiment of the present disclosure.

FIG. 2 illustrates a carousel user interface according to an embodiment of the present disclosure. The carousel user interface ("carousel interface") 200 visually resembles an airport baggage claim carousel. The carousel interface 200 includes a reference region 210 at the center, a carousel belt region 220 that wraps around one end of the reference region 210, and a plurality of objects (or items) (e.g. objects 230, 232, and 234) arranged on various areas of the carousel interface. The dotted lines represent borders that define particular features of the carousel user interface 200. The borders represented by the dotted lines may or may not be displayed according to the respective embodiment.

Each object (such as object 230, 232, 234, or 236) may represent navigable hierarchical nodes for applications, media files (audio, video, images, and such), messages (e-mail, SMS, MMS, and such), contacts, calendar appointments, browser bookmarks, documents, and such. The nodes may represent a category/group that includes other nodes or data. Groups/hierarchies may be defined by functionality (e.g. for apps: games), type of data (message, appointment, song), time period, person, name (letter/range in alphabetical order), abstract concepts (e.g. for apps: currently running), and so forth. In the embodiment illustrated in FIG. 2, the objects are represented by circles with icons/images/texts. In other embodiments, the objects may be represented by other shapes, colors, visual schemes, or 3D models that represent the data (e.g. a 3D model of a phone for making a phone call).

The reference region 210 is located at the center of the carousel interface 200 and is approximately defined by dotted lines. For explanatory purposes, the reference region 210 is illustrated with vertical lines. The reference region 210 displays the current navigation path, and as such, objects displayed in the reference region 210 include the most recently navigated object (i.e. "currently navigated object" or "last navigated object 232") and previously navigated objects (e.g. previously navigated object 234). In an embodiment, the objects in the reference region 210 are arranged such that the last navigated object would be placed at the end of reference region 210 where the carousel belt 220 wraps around, and the previously navigated objects would be arranged in reverse sequence of navigation below the last navigated object 232, such that the oldest navigated object would be located furthest from the last navigated object 232. In some embodiments, last navigated object 230 may displayed more prominently than the previously navigated objects (e.g. previously navigated object 234) in the reference region 210. For example, the last navigated object 232 which represents the hierarchical node for "Media" is displayed at the end of the reference region 210 where the carousel belt 220 wraps around, and is slightly larger than the previously navigated object 234 in the reference region 210.

In some embodiments, the previously navigated objects in the reference region 210 may be displayed such that they are partially covered by a subsequently navigated object. For example, last navigated object 232 is displayed at the top end of the reference region 210 where the carousel belt 220 wraps around and partially covers the previously navigated object 234 in the reference region 210.

The carousel belt 220 wraps approximately 180 degrees around the last navigated object 232, and appears as though the ends extend in straight lines to the bottom. In an embodiment, the carousel belt 220 may be oriented in any direction. The carousel belt includes objects that are currently navigable by the user, based on the current navigation path. That is, the objects (such as objects 230 and 236) in the carousel belt 220 represent nodes in a hierarchy that belong to the node represented by the last navigated object 232. For example, objects displayed in the carousel belt 220 (e.g. "Photos", "Video", "Audio", and so forth) represent nodes that belong to the last navigated object 232 (e.g. "Media"). Here, the hierarchy is organized based on context of the data content. However, the carousel interface 200 may support multiple hierarchies that are organized based on different types of relationships or any user-defined scheme.

The user may select any of the objects on the carousel 220. In an embodiment, the user may select any object on the carousel interface 200 by tapping on the desired object. Upon selecting one of the objects on the carousel belt 220, the carousel interface 200 may navigate (or drill down) to the selected node represented by the selected object. This will be further described further below with reference to FIGS. 4A-4C.

When the objects that belong to the last navigated object 232 are too numerous to be displayed on the carousel belt 220 (e.g. contact list or media playlist), they may disappear beyond the edge of the display. In such circumstances, the user may use a gesture to scroll (i.e. move) the objects on the carousel belt 220. In one embodiment, the user may scroll the objects on the carousel belt 220 by sliding a finger along the carousel belt in the desired scrolling direction. In another embodiment, the user may touch the last navigated object 232 and make a sliding gesture toward either extended end of the carousel belt 220 to scroll objects.

In some embodiments, the carousel belt 220 may be divided into a selection area 224 and at least one scrolling area (e.g. scrolling areas 226 and 228). For explanatory purposes, the selection area 224 is illustrated with horizontal lines, and the scrolling area is illustrated with diagonal lines. In an embodiment, the location and size of the scrolling areas 226 and 228 may be different or user-defined. For example, the scrolling areas 226 and 228 may be smaller and located at the respective ends of the carousel belt. In this embodiment, a user may not be able to select an object while it is in one of the scrolling areas 226 and 228. That is, only objects that are located in the selection area 224 or reference region 210 may be selected by the user. For example, a user may not select object 236 until it is scrolled (i.e. moved) into the selection area 224. In contrast, object 230, the last navigated object 232, and the previously navigated object 234 may be selected by the user. In order to scroll the carousel belt 220, the user may touch the scrolling area 226 or 228, depending on the desired direction of scrolling. For example, the user may scroll the carousel belt 220 in a counter-clockwise direction by touching scrolling area 226 and in a clockwise direction by touching scrolling area 228, or vice versa. Other gestures such as flicking or sliding may be used to control scrolling, depending on the embodiment. For example, the user may scroll the objects on the carousel belt 220 by touching the last navigated object 232 and use a sliding gesture toward one of the scrolling areas 226 or 228 without releasing contact with the touchscreen.

Figure 3:
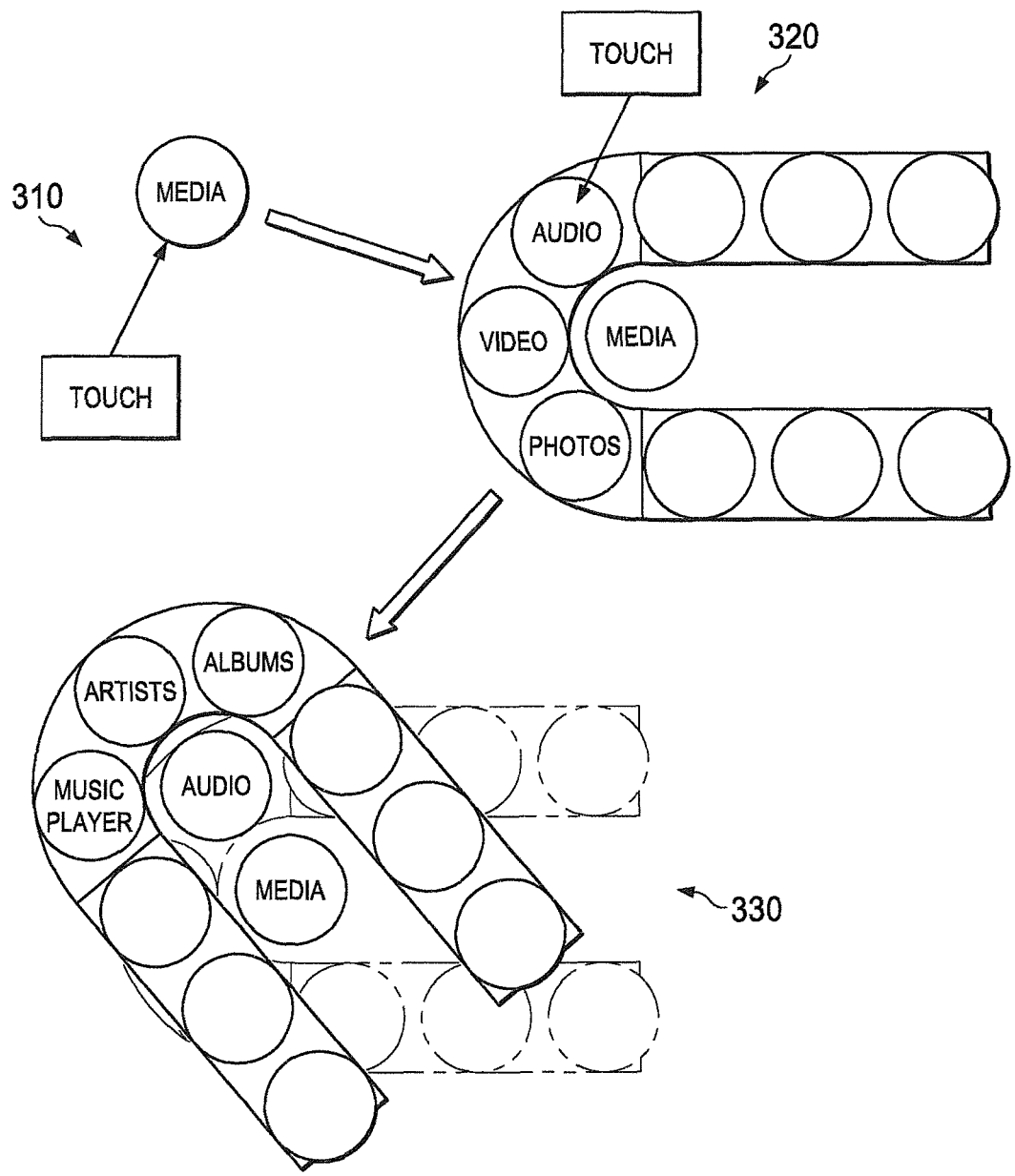
FIG. 3 illustrates a sequence of navigation using the carousel interface according to an embodiment of the present disclosure.

FIG. 3 illustrates a sequence of navigation using the carousel interface according to an embodiment of the present disclosure. Illustrated are three steps of navigation. The user initially selects a root object of a hierarchy, in step 310. As shown the user selects the root object for the "Media" hierarchy. The root object may be selected by a touch gesture, such as tapping on the root object (or icon). In an embodiment, a home screen may present one or more root objects that a user can select in order to use the carousel interface. In another embodiment the root objects may be presented as objects on a carousel interface. Objects that represent frequently accessed hierarchies may be directly on the home screen or accessible with little navigation. Rarely used items may require more levels of navigation.

Upon selecting the root object, the device navigates to the root node of the hierarchy displays the carousel interface (e.g. carousel interface 200) in step 320. Here, the carousel is oriented horizontally, with the ends of the carousel belt (e.g. carousel belt 220) moving toward the right. In another embodiment, the carousel may be oriented in any direction. As illustrated, the last selected/navigated object "Media" (e.g. last navigated object 232), which also happens to be the root object in this step, is placed at the closed end of the reference region (e.g. reference region 210) where the carousel belt wraps around). The objects presented on the carousel belt (e.g. "Audio", "Video", and "Photos") represent nodes that belong to the last navigated object (i.e. the most recently navigated object).

In the embodiment in which the carousel belt does not designate the selection and scrolling areas, a user may select any of the objects displayed on the carousel interface. However, selecting the last navigated object in the reference region would do nothing. Here, the user selects the object on the carousel belt that represents the node for "Audio."

Upon selecting the "Audio" object from the carousel belt, the device navigates to the corresponding node in the hierarchy and updates the carousel interface in step 330. It is noted that in the embodiment illustrated in step 330, the carousel interface is moved based on an offset between the closed end of the reference region and the location of the selected object. In addition, carousel interface has been rotated to reflect the direction of movement from the last navigated object and the selected object of step 320. This movement and rotation of the hierarchy visually reflects the navigation process, as the selected object "Audio" is now located in the reference region as the last navigated object, and the previously navigated object "Media" is located one position away from the last navigated object. In other embodiments, the orientation of the carousel interface may not change between navigation steps. In step 330, the carousel belt has also been updated to display objects (e.g. "Music Player", "Artists", and "Albums") that represent nodes that belong to the "Audio" node. At this point, the user may select an object in the carousel belt to continue navigating further or select any of previously navigated objects in the reference region to return to an earlier navigation path.

It is also noted that the objects presented on the carousel belt in step 320 correspond to hierarchy nodes that each represents a context/category/group of other nodes. As such, selection of the hierarchy node "Audio" updated the carousel interface. However, if the objects presented on the carousel belt represent actions related to the last selected object (e.g. play an audio file, call a contact, send a text message to a contact, edit a calendar item, and such), selecting the action may cause the device to perform the function (or execute an application) related to the combination of the last navigated object and the selected action (or context of the hierarchy node and action) and exit the carousel interface. The actions may be user defined or automatically determined based on the context of the last navigated object.

According to an embodiment, an object/action or action/object user interface (UI) paradigm may be used depending on how the hierarchy is configured. For example, a phone call to a contact may be initiated by: 1) navigating to the contact, then continuing navigation to a "call" action, or 2) navigating to a "call" action, then continuing navigation to a specific contact.

Figure 4A:
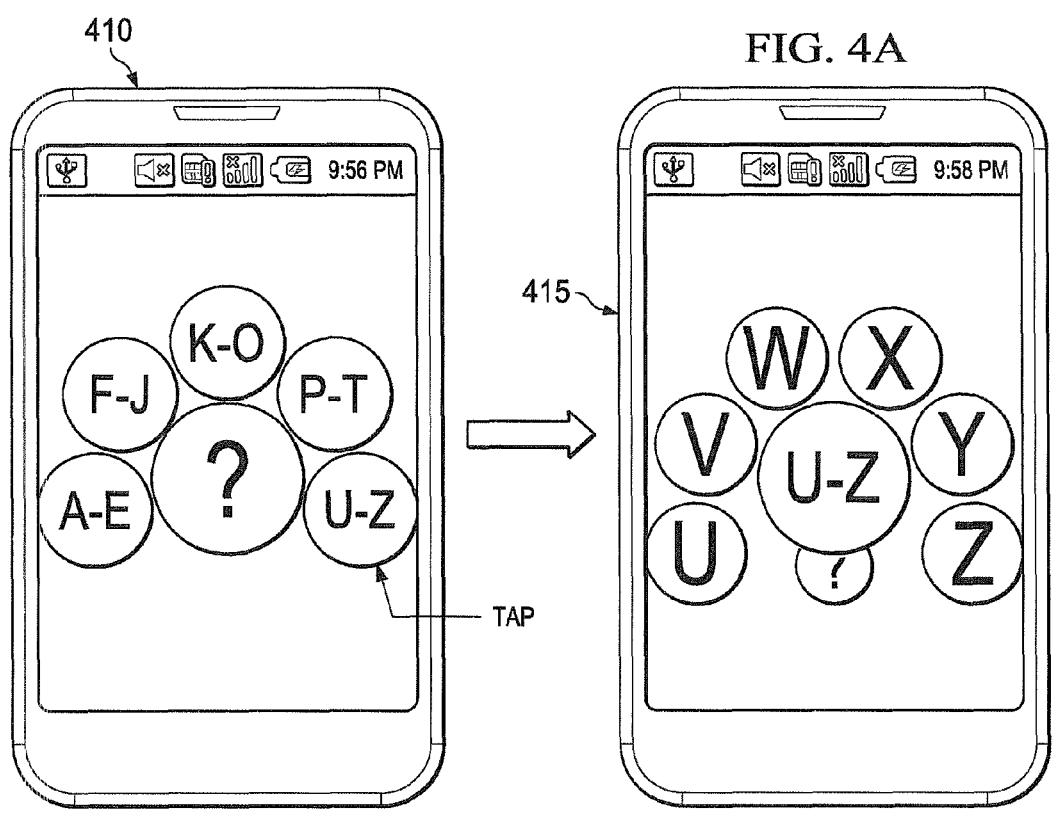
FIG. 4A illustrates navigating to a desired object by using a tapping gesture to select the desired object according to an embodiment of the present disclosure.
Figure 4B:
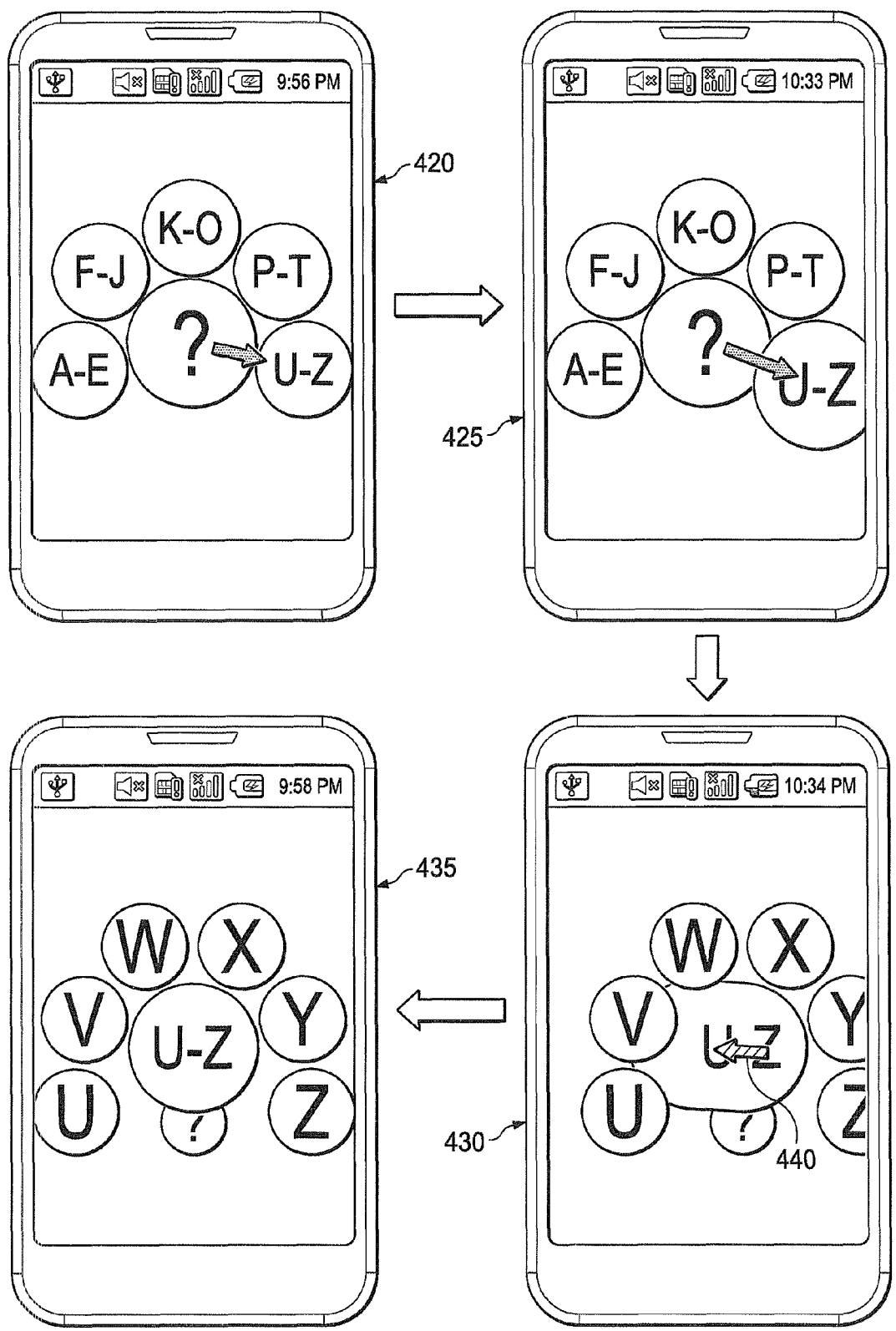
FIG. 4B illustrates navigating to a desired object by using a sliding/dragging gesture according to an embodiment of the present disclosure.

FIGS. 4A and 4B illustrate some of the gestures that may be used to select objects in the carousel interface. The illustrated gestures are merely examples and are not intended to limit the scope of the present disclosure. Also, all of the examples use the scenario of navigating to the object "U-Z" in the carousel belt. However, the same concepts may be applied to select a previously navigated object in the reference region (e.g. reference region 210).

FIG. 4A illustrates navigating to a desired object by using a tapping gesture to select the desired object according to an embodiment of the present disclosure. In screen 410, carousel interface is displayed with the last navigated object "?" in the reference region and objects "A-E", "F-J", "K-O", "P-T", and "U-Z" arranged on the carousel belt. The last navigated object "?" is also the root object because it is the only previously navigated object in the reference region. If necessary, the user may scroll the objects that are on the carousel belt by using any of the scrolling methods described with reference to FIG. 2. When the user taps one of the objects on the carousel belt, the device navigates to the selected object and updates the carousel interface as described with reference to FIGS. 2 and 3. For example, when the user taps on object "U-Z" in screen 410, the carousel interface is updated as shown in screen 415. According to an embodiment, the carousel interface may or may not be rotated to reflect the direction of movement from the last navigated object and the selected object. The selected object "U-Z" is placed in the reference region as the last navigated object (i.e. currently navigated object), and the object "?" (which was previously the last navigated object) is moved one step below the currently navigated object "U-Z". The objects labeled "U", "V", "Y", and "Z", which belong to the currently navigated object "U-Z" are displayed on the carousel belt. This can be repeated until a leaf item (i.e an object that is associated with an action) is selected. In an embodiment, a user may preview objects at least a subset of objects that belong any of the navigable objects in the carousel interface by touching the object and holding the touch for a time duration. Also, screens 410 and 420 depict an embodiment in which the last navigated object is larger than all other objects in the carousel interface, and the previously navigated objects other than the last navigated object are smaller than all other objects in the carousel interface.

FIG. 4B illustrates navigating to a desired object by using a sliding/dragging gesture according to an embodiment of the present disclosure. For convenience, screen 420 is identical to screen 410. In screen 420, the user touches the last navigated object and, while substantially maintaining contact with the screen, makes a sliding motion (or dragging motion) toward the desired object (i.e. object "U-Z"). The solid arrow indicates the progression of the sliding motion. As the sliding motion reaches an object, the object increases in size, as shown in screen 425. The increase in size indicates that the object may be selected by the user. In an embodiment, releasing the touch when an object becomes larger device may constitute a selection of the object. In some embodiments, the carousel interface may allow continuous drag such that sliding the touch substantially into an object constitutes the selection of the object. That is, when the user moves substantially toward the object, the carousel interface centers around the selected object, and a new carousel belt is displayed around the selected object, as shown in screen 430. The last navigated object may become smaller to be grouped with any other previously navigated object, as shown in screen 430.

As shown in screen 430, the carousel belt is formed around the selected object "U-Z", but the carousel interface is not centered relative to the display screen. This is because the user's touch position on the screen is now offset from the actual center of the display. As such, the selected object "U-Z" is elongated to substantially reflect the offset between user's current touch position and the actual center of the display screen. The striped arrow 440 indicates the direction of an optional slide that the user may perform to center the carousel interface. Alternatively, the previously navigated objects in the reference region may be used as a reference point to center the carousel interface. The centered updated carousel is shown on screen 435. However, the user may continue to navigate to other navigable objects without centering the carousel interface. In this way, the user may navigate from the root object of the hierarchy to a leaf node without breaking contact with the screen.

In an alternate embodiment, the updated carousel interface may be automatically centered on the display, such that after an object is selected in screen 425, the carousel interface skips screen 430 and goes directly to screen 435. In yet another embodiment (not illustrated), a user may select an object simply by touching the object and making a sliding movement toward the center.

Figure 5:
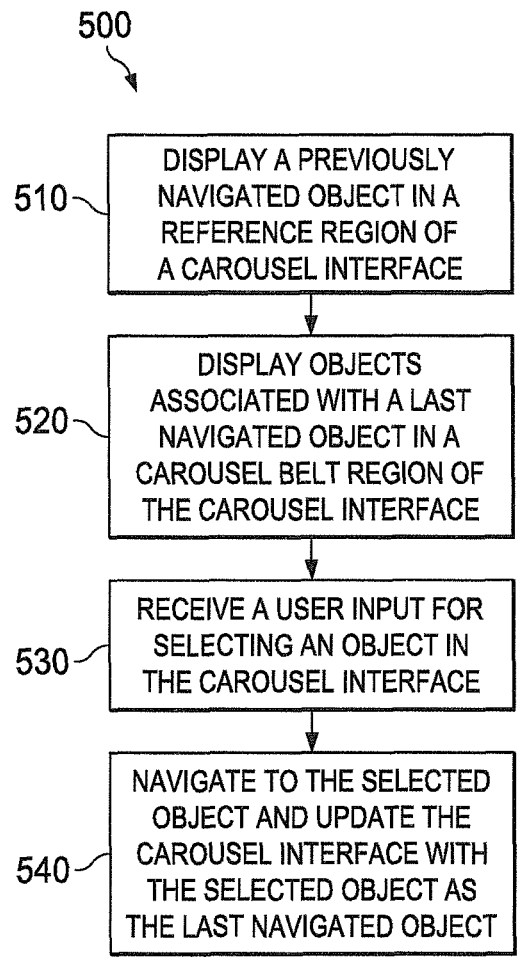
FIG. 5 illustrates a process for providing a carousel user interface according to an embodiment of the present disclosure.

FIG. 5 illustrates a process for providing a carousel user interface in a touchscreen enabled device according to an embodiment of the present disclosure. The touchscreen-enabled device may operate as described with reference to FIG. 1. In block 510, the touchscreen enabled device displays at least one previously navigated object in the reference region (e.g. reference region 210) of the carousel interface (e.g. carousel interface 200), which is presented on the touchscreen display. That is, the last navigated object (i.e., currently navigated object or most recently navigated object) is the only object in the reference region if it happens to be the root object in the hierarchy.

In block 520, the objects associated with the last navigated object are displayed in a carousel belt region (e.g. carousel belt 220) of the carousel interface. In block 530, the device receives a user input for selecting an object in the carousel interface. As mentioned earlier, any object in the carousel interface may be navigable, except the last navigated object. The user input for selecting an object may be at least one of the gestures described in the present disclosure, any variation thereof, or any other gestures that are well-known by those of ordinary skill in the art. The user input may be detected by a touch sensor and interpreted by a controller or processor that controls the carousel interface.

In block 540, in response to receiving the user input for selecting the object, the device navigates to the selected object and updates the carousel interface with the selected object as the last navigated object.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a touchscreen enabled device, a method comprising:
    displaying multiple previously navigated objects in a reference region of a carousel interface, the previously navigated objects including a most-recently navigated object;
    displaying a plurality of objects in a selection region of a carousel belt region of the carousel interface that wraps around one end of the reference region, the displayed objects in the carousel belt region associated with the most-recently navigated object;
    circulating objects in the selection region through a variable linear scrolling region connected to the selection region;
    receiving a user input for selecting one of the objects in the carousel interface; and
    in response to the user input, navigating to the selected object and updating the carousel interface with the selected object as the most-recently navigated object in the reference region;
    wherein the most-recently navigated object in the reference region covers and obscures at least a portion of at least one other previously navigated object in the reference region.

2. The method of claim 1, wherein, when the selected object is from the carousel belt region, updating the carousel interface comprises:
    moving each object in the reference region by one position away from the one end of the reference region;
    adding the selected object to the one end of the reference region; and
    displaying objects associated with the selected object in the carousel belt region.

3. The method of claim 1, wherein, when the selected object is one of the previously navigated objects in the reference region, updating the carousel interface comprises:
    removing from the reference region any object between the selected object and the one end of the reference region;
    moving one or more remaining objects in the reference region toward the one end of the reference region such that the selected object is at the one end of the reference region; and
    displaying objects associated with the selected object in the carousel belt region.

4. The method of claim 1, further comprising indicating a current navigation path in the reference region.

5. The method of claim 4, wherein indicating the current navigation path comprises displaying the previously navigated objects according to a navigation sequence such that the most-recently navigated object is at the one end of the reference region.

6. The method of claim 1, further comprising:
    receiving a user input for scrolling the objects in the carousel belt region; and
    in response to the user input for scrolling, moving the objects in the carousel belt region along the carousel belt region.

7. The method of claim 1, wherein receiving the user input comprises detecting at least one of a discrete touch event or a swiping gesture on a touchscreen.

8. A device comprising:
    a touchscreen configured to receive user input and display a carousel interface comprising a reference region and a carousel belt region that wraps around one end of the reference region, the carousel belt region comprising a selection region and a variable linear scrolling region, the reference region comprising multiple previously navigated objects including a most-recently navigated object, the selection region comprising a plurality of objects associated with the most-recently navigated object; and
    a controller configured to control the touchscreen and, in response to a user input for selecting one of the objects in the carousel interface, navigate to the selected object and update the carousel interface with the selected object as the most-recently navigated object;

wherein the most-recently navigated object in the reference region covers and obscures at least a portion of at least one other previously navigated object in the reference region.

9. The device of claim 8, wherein, when the selected object is from the carousel belt region, the controller is configured to:
move each object in the reference region by one position away from the one end of the reference region;
add the selected object to the one end of the reference region; and
display objects associated with the selected object in the carousel belt region.

10. The device of claim 8, wherein, when the selected object is one of the previously navigated objects in the reference region, the controller is configured to:
remove from the reference region any object between the selected object and the one end of the reference region;
move one or more remaining objects in the reference region toward the one end of the reference region such that the selected object is at the one end of the reference region; and
display objects associated with the selected object in the carousel belt region.

11. The device of claim 8, wherein the reference region indicates a current navigation path.

12. The device of claim 11, wherein the current navigation path comprises the previously navigated objects in sequence according to a navigation sequence such that the most-recently navigated object is at the one end of the reference region.

13. The device of claim 8, wherein the controller is further configured to move the objects in the carousel belt region along the carousel belt region in response to a user input for scrolling the objects in the carousel belt region.

14. The device of claim 8, wherein the controller is further configured to interpret at least one of a discrete touch event or a swiping gesture on the touchscreen as user input on the carousel interface.

15. For use in a touchscreen enabled device, a method comprising:
displaying a carousel interface comprising a reference region and a carousel belt region that wraps around one end of the reference region, the carousel belt region including a selection region comprising a plurality of objects and a variable linear scrolling region connected to the selection region, the reference region comprising multiple previously navigated objects including a most-recently navigated object, the carousel belt region comprising objects associated with the most-recently navigated object; and
in response to a user input for selecting one of the objects in the carousel interface, navigating to the selected object and updating the carousel interface such that the selected object is displayed in the reference region as the most-recently navigated object and objects associated with the selected object are arranged on the carousel belt region;
wherein the most-recently navigated object in the reference region covers and obscures at least a portion of at least one other previously navigated object in the reference region.

16. The method of claim 15, further comprising displaying the previously navigated objects in the reference region according to a navigation sequence such that the most-recently navigated object is at the one end of the reference region and an oldest navigated object is furthest from the one end of the reference region.

17. The method of claim 16, further comprising detecting one of a user input for scrolling the objects in the carousel belt region and the user input for selecting one of the objects in the carousel interface.

18. The method of claim 17, wherein the user input for selecting one of the objects in the carousel interface comprises one of:
a swiping gesture from the most-recently navigated object to one of:
one of the objects in the carousel belt region or another of the previously navigated objects in the reference region; and
a tapping gesture of one of one of the objects in the carousel belt region or another of the previously navigated objects in the reference region.

19. The method of claim 17, wherein the user input for scrolling the objects in the carousel belt region comprises one of:
a swiping gesture from the most-recently navigated object to a scrolling area of the carousel belt region; and
a swiping gesture along the carousel belt region.

20. The method of claim 16, wherein updating the carousel interface comprises:
moving each of the previously navigated objects in the reference region one position away from the one end of the reference region;
centering the carousel interface around the selected object such that the selected object is at the one end of the reference region; and
displaying objects associated with the selected object in the carousel belt region.

21. An apparatus comprising:
a processor configured to cause a touchscreen to display a carousel interface comprising a reference region and a carousel belt region that wraps around one end of the reference region, the carousel belt region including a selection region comprising a plurality of objects and a variable linear scrolling region connected to the selection region, the reference region comprising multiple previously navigated objects including a most-recently navigated object, the carousel belt region comprising objects associated with the most-recently navigated object;
the controller also configured, in response to a user input for selecting one of the objects in the carousel interface, to navigate to the selected object and update the carousel interface with the selected object as the most-recently navigated object;
wherein the most-recently navigated object in the reference region covers and obscures at least a portion of at least one other previously navigated object in the reference region.

22. The method of claim 16, wherein the selection region has a fixed radius, and the scrolling region contains a variable number of objects.

23. The method of claim 1, further comprising:
receiving a user input for scrolling the objects in the selection region of the carousel interface; and
in response to the user input, ceasing to display at least one object in the carousel belt region off the screen, and commencing to display at least one additional object in the carousel belt region.

* * * * *